May 16, 1939.　　　　　　　R. J. GITS　　　　　　2,158,418

OIL SEAL

Filed Sept. 14, 1936

Inventor
Remi J. Gits
by Rummler, Rummler & Woodworth
his Attys.

Patented May 16, 1939

2,158,418

UNITED STATES PATENT OFFICE 2,158,418

OIL SEAL

Remi J. Gits, Chicago, Ill.

Application September 14, 1936, Serial No. 100,695

2 Claims. (Cl. 288—1)

This invention relates to oil seals for rotating or reciprocating shafts and particularly to capsule or cartridge type oil seals arranged to surround a shaft and for pressed fit insertion into a housing.

The main objects of this invention are to provide an improved oil seal construction; to provide a simplified and more efficient packing member and contracting assembly means; to provide an improved and simplified contracting element; and to provide an oil seal construction having fewer component parts and reduced cost of manufacture.

An illustrative embodiment of this invention is shown in the accompanying drawing in which Fig. 1 is a sectional view of the improved oil seal in position on a shaft.

Figure 1:
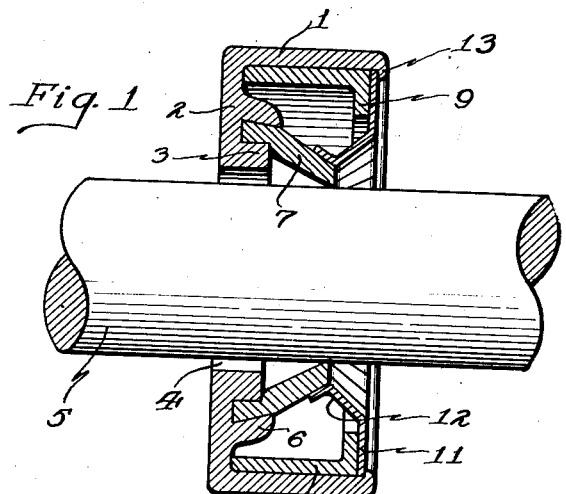

In the form shown in the drawing, the improved oil seal comprises a cylindrical housing, having an annular axially extending flexible packing member secured therein, and having an annular contracting element comprising a plurality of resilient axially extending fingers which extend in the direction opposite the axially extending portion of the packing member, and are arranged to engage the contacting end of the packing member to effect substantially a line contact between the packing member and shaft which it surrounds.

As shown, the annular shell or housing 1 is a cylindrical member having an inwardly projecting radial flange 2 at one end and an annular collar-like re-entrant portion 3 defining a central apperture 4 through which a shaft 5 extends. A second inwardly projecting annular collar 6, integral on the flange portion 2 and concentrically spaced between the re-entrant portion 3 and the side wall of the cylinder member 1, is provided as a clamping means to secure one end of an annular, axially extending flexible packing member 7. The collar 6 and the re-entrant portion 3 form an annular channel between them into which the end of the packing member 7 is inserted and secured by swedging the collar 6 inwardly toward the re-entrant portion 3 thereby clamping the packing member between the marginal edges of the collar and the portion 3 as shown in Fig. 2.

The packing member 7 which is preferably of leather, but which may be of any other suitable material, is arranged to converge inwardly toward the shaft 5 and in a generally axial direction so that its marginal edge, opposite the clamped end of the packing, will engage the shaft 5 in substantially a line contact.

Figure 2:
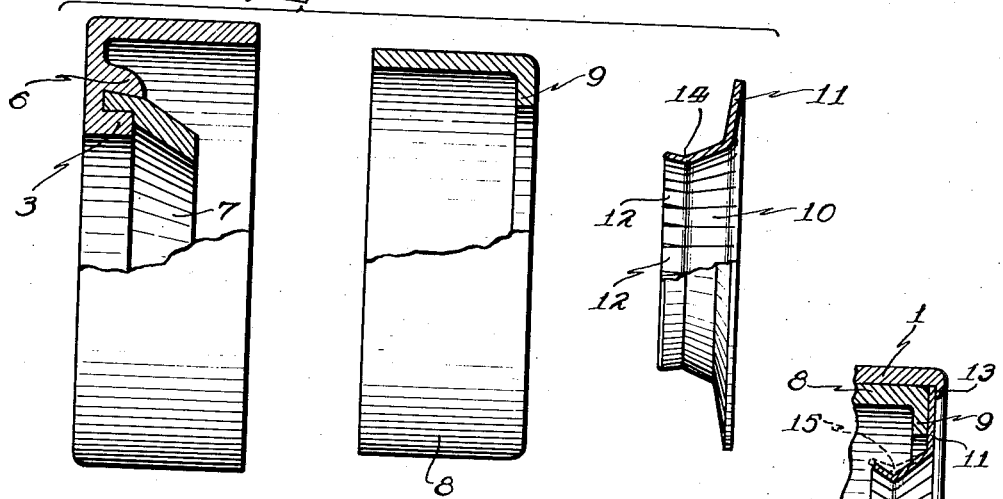
Fig. 2 is a view showing the separate component parts of the oil seal partially sectioned and arranged in the order of their assembly.
Figure 3:
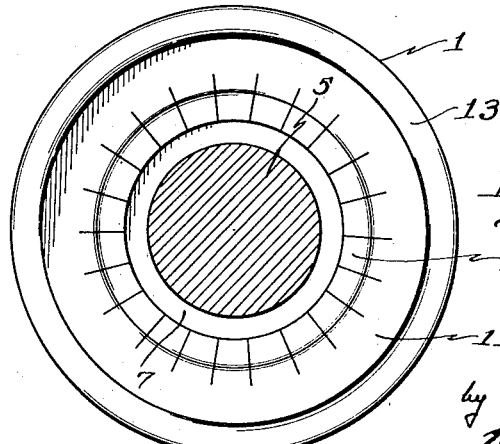
Fig. 3 is an end view of the seal showing the arrangement of the contracting member, the shaft being shown in section.

As shown in Figs. 1 and 2, a second annular shell 8 is positioned telescopingly in the shell 1 and is proportioned to fit the inner side wall of the same. The shell 8 is of less depth than the depth of the interior of the shell 1 so that the margin of the latter will extend somewhat beyond the outer end of the member 8 and an inwardly extending radial flange 9 is provided on the outer end of the member 8.

An annular contracting member 10, having an outwardly extending radial flange portion 11 and a plurality of axially extending fingers 12 is next positioned against the flange 9 of the member 8 with the fingers 12 extending inwardly toward the end of the packing member 7 so as to engage the same. The contracting member 10 is then secured in assembled position by rolling, swedging, or otherwise inwardly turning the marginal edge 13 of the shell 1, the inwardly turned edge 13 clamping the margin 11 of the contracting member 10 against the flange 9 of the member 8. The inner end of the member 8 engages the flange 2 of the shell 1 and thus the member 8 serves as a rigid spacer or backing element for the contracting member 10.

As shown in Fig. 2 the contracting member 10 is formed from a suitable resilient material and in the forming operation the flange 11 is somewhat flared or inclined in the axial direction opposite the direction in which the fingers 12 project and the fingers 12 are arranged to converge axially inward toward each other. The fingers 12 are formed by splitting or cutting the axially extending side wall of the member 10. Also the ends of the fingers 12 are flared or turned divergingly outward so as to flatly engage the side margin of the packing and provide an annular ridge-like portion 14 which maintains a sharp pressure contact between the contracting member and the packing member 7 and hence locates the line of contact between the end of the packing member and the shaft 5.

Figure 4:
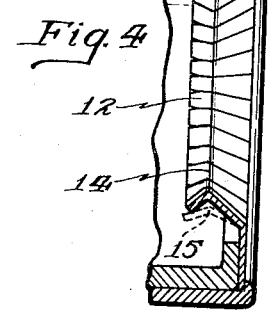
Fig. 4 is a fragmentary sectional view of the assembled contracting member illustrating its manner of operation.

In its normal unassembled state, the contracting member has the shape and appearance shown in Fig. 2, however, upon being assembled into the seal the radial flange 11 of the contracting member is flattened to a position at right angles or normal to the axis of the seal and the shaft as shown in Figs. 1 and 4, which flattening operation causes the fingers 12 to resiliently contract inwardly toward the end of the packing member 7 as shown in Fig. 4 wherein the normal position of the fingers 12 is shown in dotted outline at 15. Thus, during the assembly of the contracting member into the seal the securing operation, which flattens the flange 11 to a position normal to the axis of the seal, serves to automatically tension the fingers 12 so that they will resiliently engage the end of the packing member 7 and constantly urge the same toward the shaft 5 in such a manner as to provide a substantially perfect line contact between the packing member and the shaft.

In oil seals it has been found that the utmost efficiency is obtained wherever line contact between the packing member and the shaft is had, for the reason that to provide a perfect seal it is necessary to break down the oil film which forms on the periphery of the shaft. Such a break down cannot be had where there is broad contact between the packing member and the shaft and can only be had where a line contact of the smallest possible width is obtained. Heretofore it was sought to obtain such line contact by means of springlike contracting elements which were either in the form of a garter spring or in the form of a collar having a plurality of resilient axially extending fingers which extend in the same direction and parallel with the converging, shaft engaging, portion of the packing member. These types of contracting members, without exception, were placed over the packing member so as to engage substantially the major portion of the converging end of the same with the result that the shaft contacting area of the packing member was too broad for efficient sealing.

In the present arrangement the contracting member fingers are disposed so as to extend in the opposite direction from the arrangements heretofore employed, so that only the shaft contacting tip of the packing member is engaged by the ends of the resilient contracting fingers. With this arrangement it is found that substantially perfect line contact between the packing member and the shaft is had. Other advantages of my improved oil seal reside in the arrangement wherein during the flattening operation on the radial flange 11 of the contracting member when the seal is assembled, the resilient contracting fingers 12 are automatically tensioned and urged inwardly against the end margin of the packing member 7. Another advantage is had in the arrangement wherein the tips of the contracting fingers 12 are flared outwardly so that while only a small portion of the end of the packing member 7 is engaged between fingers 12 such engagement will provide for automatic take-up and compensate for wear on the shaft engaging margin of the packing member.

It will also be apparent that my improved seal has the advantage of simplicity of construction, simplicity of the component parts and hence ease and low cost of manufacture.

Although but one specific embodiment of this invention is herewith shown and described, it will be understood that numerous details of the construction shown may be altered or omitted without departing from the spirit of this invention as defined by the following claims.

I claim:

1. As an article of manufacture, an oil seal comprising an annular shell having an inwardly extending radial flange at one end, an annular flexible sleeve-like packing member having one end secured in said shell adjacent the flange end thereof and having an inwardly converging side wall extending axially toward the other end, an inwardly projecting radial backing flange adjacent said other end of said shell, a contracting member comprising a flat ring-like portion disposed against and extending radially across the outer face of said backing flange, said contracting member having a plurality of resilient fingers extending axially into said shell from the inner margin of said ring-like portion, and said fingers converging inwardly toward said packing member and contractibly engaging the converging end margin of the same, and means clamping the outer margin of said ring-like portion against said backing flange.

2. In a device of the class described, a contracting member comprising a flat outwardly projecting flange-like ring having a plurality of inwardly converging fingers extending axially from its inner margin the ends of said fingers being turned divergingly outward, and said flange-like ring being inclined relative to a normal to the axis thereof in the direction opposite the direction in which said fingers extend.

REMI J. GITS.